United States Patent
Arensmeier (10) Patent No.: US 9,303,897 B2
(45) Date of Patent: Apr. 5, 2016

(54) COMPENSATING FOR SENSOR THERMAL LAG

(75) Inventor: Jeffrey N. Arensmeier, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 876 days.

(21) Appl. No.: 13/494,524

(22) Filed: Jun. 12, 2012

(65) Prior Publication Data

US 2013/0327840 A1  Dec. 12, 2013

(51) Int. Cl.
*F23N 1/08* (2006.01)
*F24H 9/20* (2006.01)
*G05D 23/19* (2006.01)
*G01K 7/42* (2006.01)

(52) U.S. Cl.
CPC ............... *F24H 9/2021* (2013.01); *G01K 7/42* (2013.01); *G05D 23/1902* (2013.01); *F24H 9/2035* (2013.01)

(58) Field of Classification Search
CPC ....... F24H 9/2021; F24H 9/2035; G01K 7/42; G05D 23/1902
See application file for complete search history.

(56) References Cited

U.S. PATENT DOCUMENTS

| | | | |
|---|---|---|---|
| 3,609,549 A | 9/1971 | Hausler et al. | |
| 4,106,341 A | 8/1978 | Serrano | |
| 5,026,971 A * | 6/1991 | Payne | G05D 23/1902 219/413 |
| 5,116,136 A | 5/1992 | Newman et al. | |
| 5,920,757 A | 7/1999 | Izawa et al. | |
| 2006/0013572 A1 * | 1/2006 | Phillips | F24H 9/2021 392/459 |
| 2007/0295286 A1 * | 12/2007 | Donnelly | F24H 9/2035 122/14.1 |
| 2009/0101085 A1 * | 4/2009 | Arensmeier | F23N 5/242 122/14.22 |
| 2010/0095906 A1 | 4/2010 | Leeland et al. | |
| 2011/0084794 A1 | 4/2011 | Zuchek et al. | |
| 2011/0147549 A1 * | 6/2011 | Hazzard | F24H 9/2035 248/213.2 |
| 2012/0024240 A1 * | 2/2012 | Beckley | F24H 1/18 122/14.2 |
| 2013/0276722 A1 * | 10/2013 | Bronson | G05D 23/1852 122/19.2 |

FOREIGN PATENT DOCUMENTS

EP  1048188  5/2004

OTHER PUBLICATIONS

Canadian Office action issued in Canadian Patent Application No. 2,809,846 which claims priority to the instant application, dated Sep. 18, 2014; 3 pgs.

* cited by examiner

*Primary Examiner* — Marc Norman
*Assistant Examiner* — Paolo Gonzalez
(74) *Attorney, Agent, or Firm* — Harness, Dickey & Pierce, P.L.C.

(57) ABSTRACT

A method of compensating for thermal lag in a temperature control system is performed by a controller of the temperature control system. The method includes receiving a first temperature obtained by a temperature sensing device at an end of a temperature control cycle. A second temperature obtained by the temperature sensing device is received at a pre-defined time after the end of the temperature control cycle. The method includes changing an operational set-point temperature of the temperature control system using a difference between the received temperatures.

12 Claims, 6 Drawing Sheets

COMPENSATING FOR SENSOR THERMAL LAG

FIELD

The present disclosure relates to methods and apparatus for compensating for sensor thermal lag.

BACKGROUND

This section provides background information related to the present disclosure which is not necessarily prior art.

For many water heaters, the heating of water in a tank is controlled by a processor-based control that receives and evaluates temperature information sensed by one or more thermistors immersed in the tank. The electrical and/or mechanical components of the thermistor are generally separated from the water by a physical barrier.

SUMMARY

This section provides a general summary of the disclosure, and is not a comprehensive disclosure of its full scope or all of its features.

Exemplary embodiments are disclosed of a method of compensating for thermal lag in a temperature control system. In an exemplary embodiment, a method is performed by a controller of the temperature control system. The method includes receiving a first temperature obtained by a temperature sensing device at an end of a temperature control cycle. A second temperature obtained by the temperature sensing device is received at a pre-defined time after the end of the temperature control cycle. The method includes changing an operational set-point temperature of the temperature control system using a difference between the received temperatures.

Exemplary embodiments also are disclosed of a controller for a temperature control system having at least one temperature sensing device. The controller includes at least one processor and memory configured to receive a temperature obtained by the temperature sensing device indicating that a control set-point temperature has been reached. The processor(s) and memory are also configured to receive, upon expiration of a predetermined time period after the control set-point temperature has been reached, another temperature obtained by the temperature sensing device. The processor(s) and memory are configured to use a difference between the received temperatures to offset the control set-point temperature.

Exemplary embodiments also are disclosed of a temperature control system that includes a temperature sensing device and a controller having a processor and memory configured to use a difference between a first temperature obtained by the temperature sensing device indicating that an end of a temperature control cycle has been reached and a second temperature obtained by the temperature sensing device at a pre-defined time after the end of the temperature control cycle, to offset a control set-point temperature of the temperature control system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The inventor has observed that in currently used methods for sensing temperature, a temperature sensor is imperfectly coupled thermally to a medium in or on which temperature is to be sensed. For example, in a storage-type water heater, the heating of water may be controlled by a microprocessor-based control that receives temperature information via a voltage input determined through a thermistor and thermistor assembly. The thermal mass of the thermistor assembly and the heat transfer coefficient of the materials that make up the thermistor assembly typically introduce a thermal lag between the actual temperature of the water and the temperature sensed by the thermistor. The inventor has developed and discloses herein exemplary embodiments of a controller-performed method for compensating for thermal lag in a temperature control system, so that the controller can more accurately regulate the temperature.

Figure 1:
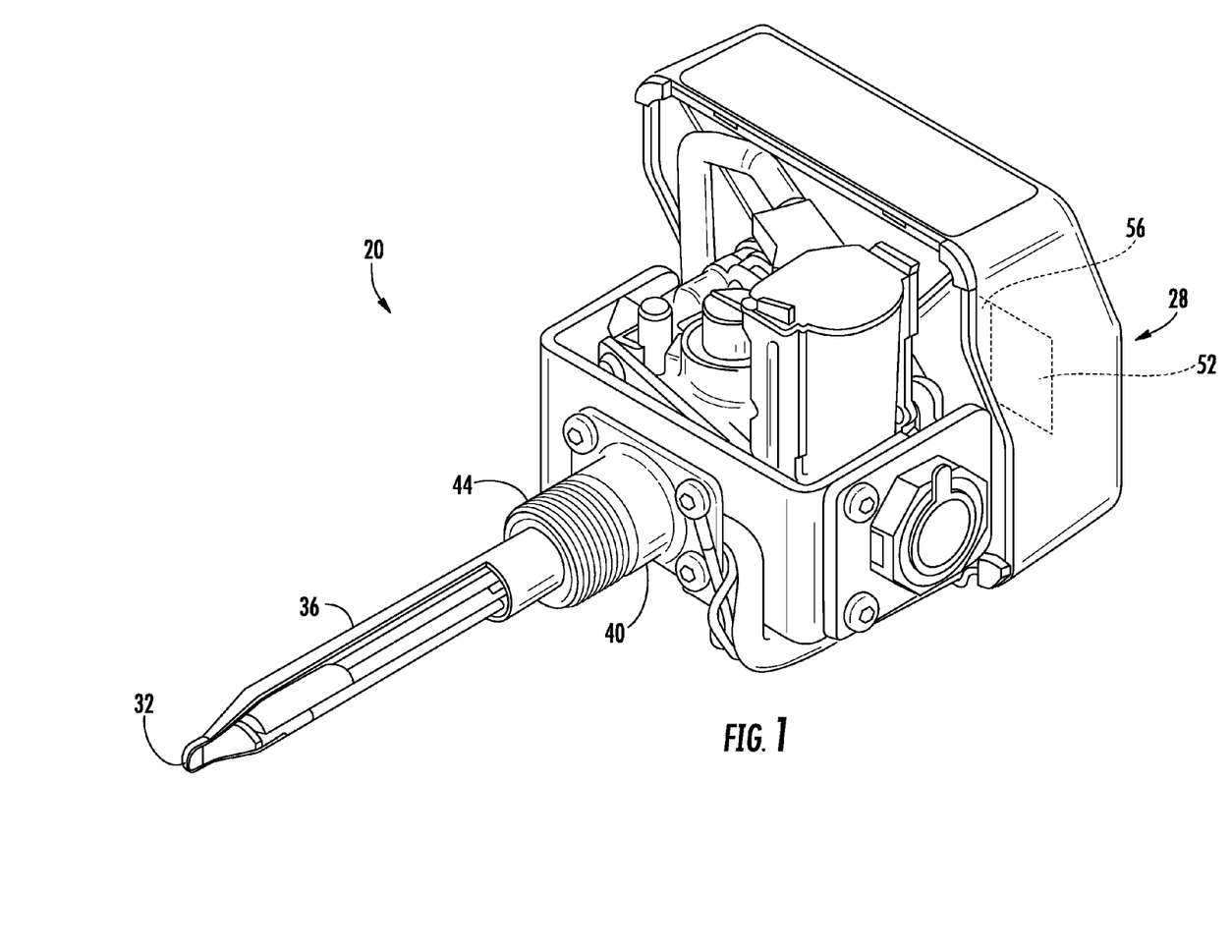
FIG. 1 is a perspective view of a temperature sensing device and controller according to an exemplary embodiment.

With reference now to the figures, FIG. 1 illustrates an example temperature sensing device 20 in relation to which a method may be performed by an example controller 28 according to one or more aspects of the present disclosure. As shown, the temperature sensing device 20 may be used, e.g., for sensing temperature in a temperature control system such as a water heater. The temperature sensing device 20 includes a thermistor 32 provided in a thermistor assembly 36. The thermistor assembly 36 is part of a probe assembly 40. The probe assembly 40 may be secured in a water heater tank wall or other water-carrying structure by a threaded region 44 such that the thermistor 32 will be immersed in the water stored in the tank.

In the present example embodiment, the probe assembly 40 is integral with the controller 28. The controller 28 includes a processor 52 and memory 56, e.g., a microprocessor and an electrically erasable programmable read-only memory (EEPROM). In various aspects of the disclosure, a probe assembly may instead be remotely located from a controller and connected thereto by a wire or cable. Exemplary embodiments of the disclosure may also be provided in relation to temperature sensing devices other than or in addition to thermistor assemblies, e.g., resistance temperature detectors, integrated circuit (IC) temperature sensors, etc. The thermistor assembly 36 and probe assembly 40 may be made of metal. In various other example temperature sensing devices, a thermistor assembly and probe assembly could be made of and/or include non-metal materials, which typically have different thermal mass and different heat transfer rates than those of metals.

In one or more aspects of the disclosure, the controller 28 receives a first temperature obtained by the temperature sensing device 20 at an end of a heating or cooling cycle. The controller 28 also receives a second temperature obtained by the temperature sensing device 20 at a pre-defined time after the end of the heating or cooling cycle. The controller 28 uses a difference between the received temperatures to change an operational set-point temperature and to offset a control set-point temperature of the water heater. Unless clearly indicated otherwise, the terms "control set-point," "control set-point temperature" and the like are used herein and in the claims to refer to a set-point temperature selected, e.g., by an installer and/or user of a temperature control system. Additionally, unless clearly indicated otherwise, the terms "operational set-point," "operational set-point temperature" and the like are used herein and in the claims to refer to a set-point temperature used in operation by a controller of a temperature control system.

Figure 2:
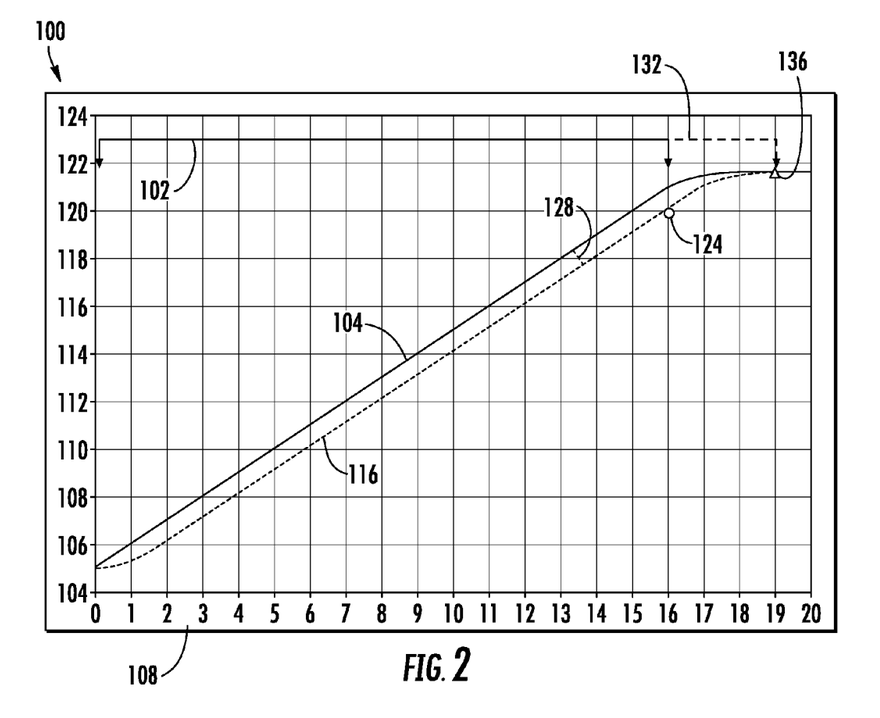
FIG. 2 is a graph of a heating cycle of a temperature control system according to an exemplary embodiment.

FIG. 2 is a graph 100 that represents an example heating cycle 102, e.g., in a water heater controlled by the controller 28. A curve 104 indicates actual water temperature (in degrees Fahrenheit) relative to time 108. A curve 116 indicates temperature (in degrees Fahrenheit) sensed by the temperature sensing device 20 relative to time 108. The heating cycle 102 is started, e.g., when a user opens a hot water faucet. At an initial call for heat by the controller 28, both the actual temperature 104 and sensed temperature 116 are at 105° F. The heating cycle 102 is ended when the controller 28 determines that water around the thermistor 32 has reached a selected control set-point 124, e.g., 120° F. A lag 128 is evident between the temperature curves 104 and 116, such that the sensed temperature 116 is less than the actual temperature 104 over substantially the entire heating cycle 102. When the thermistor 32 senses the temperature of the control set-point 124, the actual water temperature 104 has overshot the control set-point temperature 124.

In one or more aspects of the disclosure, and as shown in FIG. 2, the controller 28 records a temperature sensed by the thermistor 32 at the end of the heating cycle, typically the selected control set-point temperature 124, and waits for a predetermined time period 132 (e.g., for three minutes, etc.) after the end of the heating cycle 102. The length of the predetermined time period can vary for different types of temperature sensors (e.g., submersed sensors, surface sensors, etc.) and for different media in or on which temperature is being sensed. By way of example only, the length of the predetermined time period was empirically determined to be three minutes, but it is influenced by the thermal masses in the system and the insulation values of the materials. By way of further example, submersed sensors would tend to shorter times (e.g., less than three minutes, etc.), where surface sensors would tend to longer saturation times (e.g., more than three minutes but less than five minutes, etc.).

The controller 28 captures a temperature 136 sensed by the thermistor 32 upon expiration of the predetermined time period. The controller 28 determines a difference between the temperatures 124 and 136. The controller 28 may save and use the difference as a compensation value, e.g., as further described below, to change its operational set-point for use in controlling the water heater. In various aspects, the selected control set-point remains the same.

Thus, e.g., when the controller ends a heating cycle after determining that water in the tank is at an operational set-point of 120° F. based on a thermistor signal, the controller captures another temperature. The another temperature captured by the controller may be a temperature sensed by the thermistor at a predetermined time after the end of a call for heat, e.g., at three (3) minutes after the end of the heating cycle. The controller compares the two sensed temperatures. If, e.g., the temperature captured after the three-minute period is 122° F., the controller alters its internal operational set-point from 120° F. to 118° F., so that when the next heating cycle is complete, the actual water temperature would be at 120° F., to thereby correspond to the selected control set-point of 120° F. Two temperatures may be captured and compared in the same or similar manner after one or more heating cycles, e.g., after substantially each heating cycle, and the difference between the two temperatures may be used to compensate for thermal lag. In some aspects of the disclosure, compensation values based on such differences may be averaged and applied to one or more subsequent heating cycles.

An example method shall now be described in relation to a storage water heater that includes two thermistor assemblies, one near the top of the water tank and the other near the tank bottom. In this example embodiment, both assemblies are controlled by the same controller. The method shall be described with reference to one of the two thermistor assemblies, because this example embodiment may include the controller performing the method in the same or similar way for the other thermistor assembly. The lag should preferably be independent of the location, but dependent on the structure (e.g., submersed bottom sensors versus surface top sensors, etc.). A three minute lag time may be sufficient for submersed bottom and surface top sensors. A submersed bottom sensors may also have the same or different lag time than a surface top sensor. The lag time or function may also vary between gas water heater versus electric water heater as the electric water heater may have a top heating element.

Figure 3:
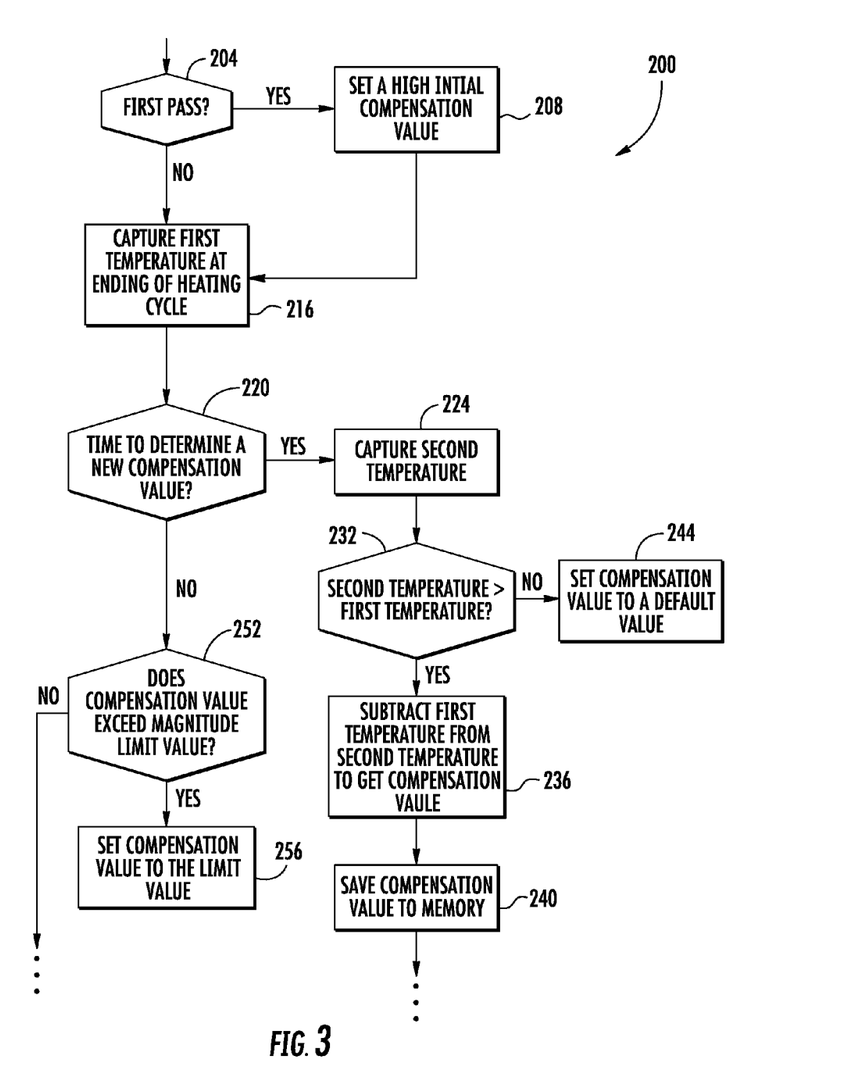
FIG. 3 is a flow diagram of a method of compensating for thermal lag according to an exemplary embodiment.
Figure 4:
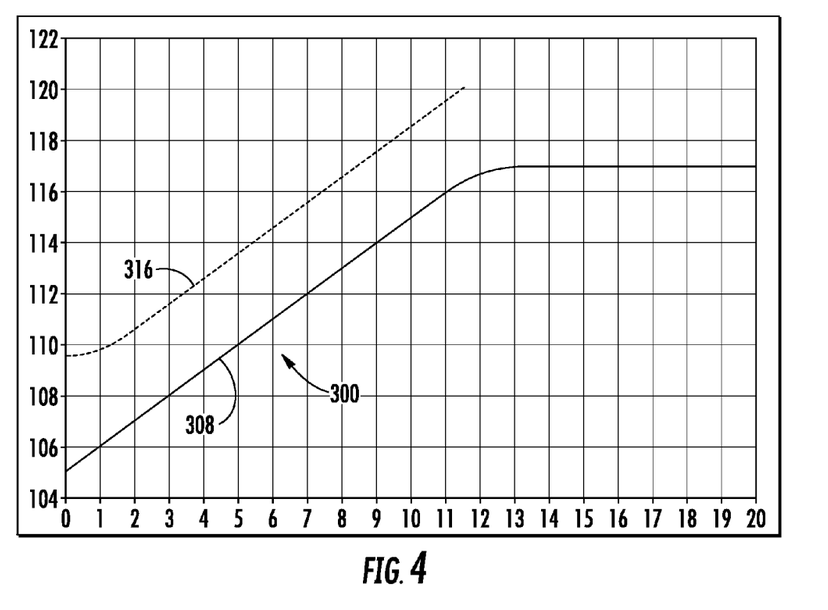
FIG. 4 is a graph of a heating cycle of a temperature control system according to an exemplary embodiment.

FIG. 3 illustrates a method 200 that may be performed, e.g., when a user switches on a water heater. In process 204, the controller determines whether it is making a first pass through the method 200, i.e., whether a first heating cycle is being performed. If so, then in process 208 the controller sets an artificially high compensation value, e.g., 3° F., for the thermistor, to prevent overshoot on the first call for heat. FIG. 4 illustrates an example initial heating cycle 300 in which an initial compensation value greater than that normally expected is used. A curve 308 represents actual water temperature (in degrees Fahrenheit). A curve 316 represents thermistor-sensed temperature (in degrees Fahrenheit) combined with the initial compensation value.

Referring again to FIG. 3, the method 200 includes process 216 in which a first temperature (which in most cases would be the control set-point temperature) is captured from the thermistor at the end of the first heating cycle. In process 220, it is determined whether the predetermined time period has passed, i.e., whether it is time to obtain a new compensation value for the thermistor. If it is time to obtain a new compensation value, then a second temperature is captured (in process 224) from the thermistor, which is to be used to obtain the new compensation value. In process 232, it is determined whether the second temperature, i.e., temperature sensed at the end of the predetermined time period, is greater than the first temperature. If yes, then in process 236 the first temperature (typically the control set-point temperature) is subtracted from the second temperature. In process 240, the difference is saved, (e.g., in EEPROM, etc.) as a compensation value for use in subsequent heating cycle(s). If in process 232, it is determined that the temperature sensed at the end of the predetermined time period is not greater than the control set-point temperature, then process 244 includes setting the compensation value to a default value, e.g., to 2° F., etc. When it is not time to determine a new compensation value, a current compensation value may be checked by determining (in process 252) whether the compensation value exceeds a predetermined maximum, e.g., 4° F., etc. If so, then in process 256 the compensation value is set to the predetermined maximum value. In this example, the maximum value is preferably limited to prevent the routine from capturing behavior other than the thermal drift that is intended to be captured. The default value simply provides the routine a place to start, thus making it simpler to implement than searching for the value and also providing overshot control on the first run.

Figure 5:
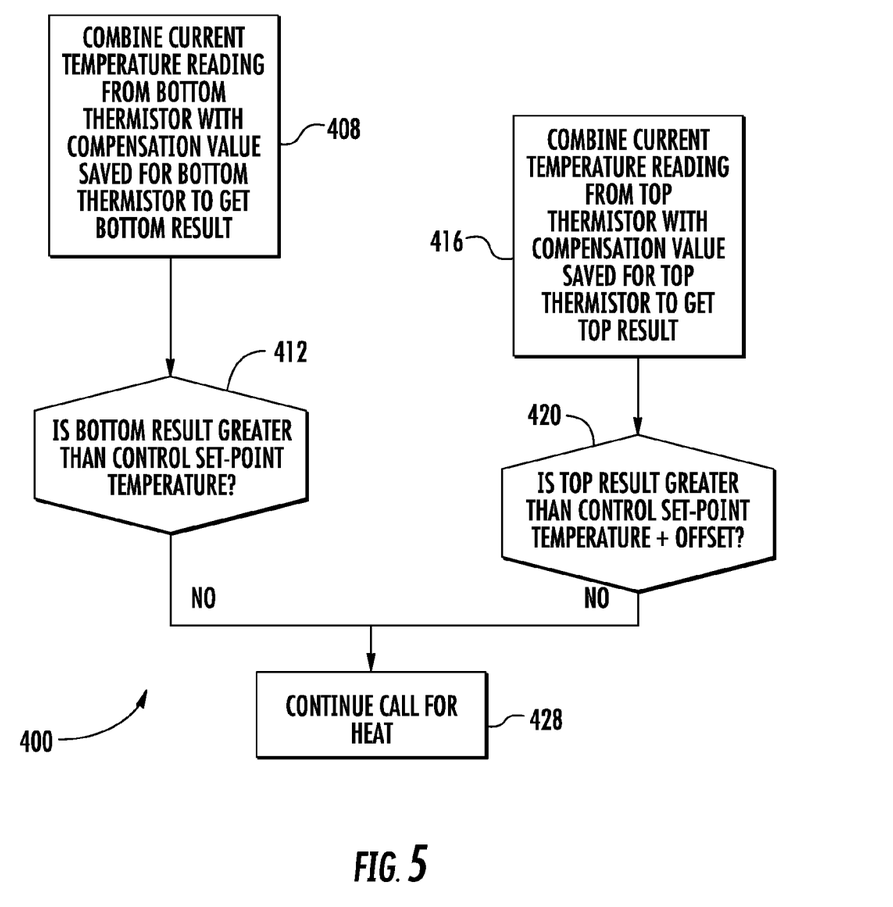
FIG. 5 is a flow diagram of a method of compensating for thermal lag according to an exemplary embodiment.

In various aspects of the disclosure, a controller may use compensation values for bottom and top thermistor assemblies to control temperature. FIG. 5 illustrates an exemplary embodiment of a method 400 for controlling temperature. In process 408, the controller combines a current temperature value sensed by the bottom thermistor with a compensation value previously saved in EEPROM for the bottom thermistor. In process 412, the controller compares the result ("bottom result") to the control set-point. In process 416, the controller combines a current temperature value sensed by the top thermistor with a compensation value previously saved in EEPROM for the top thermistor. In process 420, the controller compares the result ("top result") to the control set-point, which may be offset by a value representing a difference between temperature at the top and temperature at the bottom of the tank. In process 428, the controller continues to call for heat based on the results of the processes 412 and 420.

Figure 6:
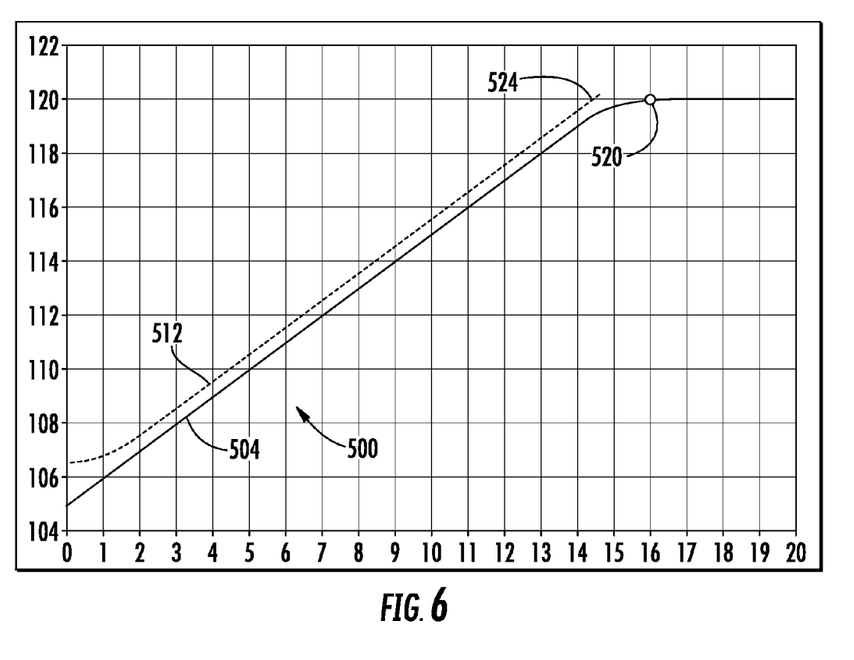
FIG. 6 is a graph of a heating cycle of a temperature control system according to an exemplary embodiment.

FIG. 6 illustrates an example heating cycle 500 that may occur subsequent to the initial heating cycle shown in FIG. 4. A curve 504 represents actual water temperature (in degrees Fahrenheit). A curve 512 represents thermistor-sensed temperature (in degrees Fahrenheit) combined with a previously determined compensation value. In various aspects, the use of compensation values results in heat being switched off at an appropriate temperature to prevent overshoot. For example, as shown in FIG. 6, an actual final temperature 520 at the end of the heating cycle 500 more closely matches a control set point temperature 524 than in the heating cycle 102 (shown in FIG. 1).

Various embodiments of the foregoing exemplary methods and controls can be highly useful in temperature control systems in which temperature sensors are substantially enclosed or encased in materials that dampen sensor response. Moreover, various exemplary embodiments of the foregoing methods and controls can compensate for changes in material. For example, a given temperature control system may employ a thermistor probe assembly made from a metal. At some future time, the temperature control system might be provided with a probe assembly made, e.g., from a polymer or other non-metal materials having heat transfer rates lower than those of metals. Although differences between sensed and actual temperatures would be greater, e.g., for a "plastic" probe assembly than for a metal probe, exemplary embodiments of the foregoing methods can automatically compensate for such differences or changes in material.

Embodiments of the foregoing methods and controls can be used in relation to well sensors and/or surface sensors. Embodiments also are possible in relation to cooling systems. The foregoing methods and systems do not require complicated mathematical steps or large calculation overhead, can be adapted to current tank conditions, and can take system aging into account. The foregoing exemplary methods can be used in relation to water heaters and in relation to many, if not most or all, temperature sensing systems that exhibit an over-damped measurement response.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges. In addition, disclosure of ranges includes disclosure of all distinct values and further divided ranges within the entire range.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A controller for a temperature control system having at least one temperature sensing device, the controller comprising at least one processor and memory configured to:
    receive a temperature obtained by the temperature sensing device indicating that a control set-point temperature has been reached, the temperature sensing device including a thermistor and probe assembly secured in a water heater tank wall by a threaded region such that the thermistor is immersed in water stored in the tank;
    upon expiration of a predetermined time period after the control set-point temperature has been reached, receive another temperature obtained by the temperature sensing device at the expiration of the predetermined time period; and
    determine a difference between the received temperatures for offsetting the control set-point temperature to set an operational set-point temperature of the temperature control system by subtracting the difference between the received temperatures from the control set-point temperature;
    wherein the length of the predetermined time period is based on insulation values of the temperature sensing device materials.

2. The controller of claim 1, configured to perform the offsetting in one or more subsequent temperature control cycles of the temperature control system.

3. The controller of claim 1, configured to perform the offsetting by changing the operational set-point temperature of the temperature control system without altering the control set-point temperature.

4. The controller of claim 1, configured to offset the control set-point temperature by changing an operational set-point temperature of the temperature control system.

5. The controller of claim 1, wherein the predetermined time period is three minutes.

6. The controller of claim 1, further configured to:
    perform the receiving steps for two or more temperature control cycles of the temperature control system;
    and use an average of the differences between the received temperatures for each of the two or more temperature control cycles to offset the control set-point temperature.

7. A water heating system comprising the controller of claim 1.

8. A temperature control system comprising:
    a temperature sensing device including a thermistor and probe assembly secured in a water heater tank wall by a threaded region such that the thermistor is immersed in water stored in the tank; and
    a controller having a processor and memory configured to use a difference between a first temperature obtained by the temperature sensing device indicating that an end of a temperature control cycle has been reached and a second temperature obtained by the temperature sensing device at a pre-defined time after the end of the temperature control cycle, to offset a control set-point temperature of the temperature control system to set an operational set-point temperature of the temperature control system by subtracting the difference between the first and second temperatures from the control set-point temperature;
    wherein the length of the pre-defined time is based on insulation values of the temperature sensing device materials.

9. The temperature control system of claim 8, configured to use the difference, in a second temperature control cycle, to change an operational set-point temperature of the temperature control system.

10. The temperature control system of claim 8, wherein the pre-defined time is three minutes.

11. The temperature control system of claim 8, configured to control heating and/or cooling.

12. A water heating system comprising the temperature control system of claim 8 and a tank.

* * * * *